(12) United States Patent
Wang

(10) Patent No.: US 9,022,557 B2
(45) Date of Patent: May 5, 2015

(54) FRAMELESS EYEGLASSES

(71) Applicant: Chih-Hung Wang, Tainan (TW)

(72) Inventor: Chih-Hung Wang, Tainan (TW)

(*) Notice: Subject to any disclaimer, the term of this patent is extended or adjusted under 35 U.S.C. 154(b) by 129 days.

(21) Appl. No.: 13/844,857

(22) Filed: Mar. 16, 2013

(65) Prior Publication Data

US 2014/0268010 A1    Sep. 18, 2014

(51) Int. Cl.
*G02C 5/16* (2006.01)
*G02C 1/02* (2006.01)
*G02C 5/14* (2006.01)

(52) U.S. Cl.
CPC .. *G02C 1/02* (2013.01); *G02C 5/16* (2013.01); *G02C 5/146* (2013.01)

(58) Field of Classification Search
CPC ............ G02C 1/02; G02C 5/14; G02C 5/146; G02C 5/16; G02C 2200/04; G02C 2200/06; G02C 2200/08

USPC .................. 351/110, 113, 114, 121, 140, 149
See application file for complete search history.

(56) References Cited

U.S. PATENT DOCUMENTS 5,032,017 A * 7/1991 Bolle et al. ..................... 351/116
6,007,199 A * 12/1999 Yang ................................ 351/86

* cited by examiner

*Primary Examiner* — Huy K Mai
(74) *Attorney, Agent, or Firm* — Rosenberg, Klein & Lee

(57) ABSTRACT

A pair of frameless eyeglasses includes a lens having two holes defined therethrough. Two temples each have a connection unit and the connection unit has a slot at a front end thereof. Two sides of the lens are engaged with the two respective slots. A resilient member has one end connected to the connection unit and the other end of the resilient member separates from the connection unit and extends toward the slot. A block is formed on the second end of each of the resilient member and engaged with the hole of the lens corresponding thereto. The temple can be easily separated from the lens by pushing the block out from the hole of the lens.

2 Claims, 5 Drawing Sheets

FRAMELESS EYEGLASSES

BACKGROUND OF THE INVENTION

1. Field of the Invention

The present invention relates to a pair of frameless eyeglasses, and more particularly, to a pair of frameless eyeglasses wherein the temples and the lenses are easily assembled and disassembled.

2. Description of Related Art

The conventional eyeglasses can be cataloged into sport eyeglasses, sunglasses, safety eyeglasses, reading eyeglasses and near-sighted eyeglasses. The eyeglasses not only assist the users to see clearly and protect their eyes, decoration features are an important role for the modern eyeglasses. The frame can be cataloged into full-frame front, semi-frame front and frameless front and the users have different options to choose from.

The frame front is installed with two lenses and two hinge units are located on two ends of the frame front so that two temples are pivotably connected to the hinge units. Because the lenses are completely enclosed by the rims of the frame front so that the weight of the eyeglasses is heavy and will a heavy load on the user's nose and ears. These eyeglasses are gradually replaced by semi-frame front or frameless front.

The conventional frameless eyeglasses comprise two lenses and each lens has a hole so as to be in alignment with the hole in the temple. A special screw is used to extend through the two respective holes to connect the lens and the temple. When replacing the temple, a screwdriver is used to remove the screw to separate the lens and the temple. The processes are inconvenient for the users and the threads of the screw and the holes are easily damaged and the screw cannot properly secure the lens and the temple after a couple times of assembling and disassembling. If the screw is not secured when it is loosened, the screw can be easily lost. Therefore, some manufacturers develop an alternative way to connect the lens and the temple by using a rivet. However, the way of riveting is difficult for the users to maintain or replace because a special tool is required.

The present invention intends to provide a frameless eyeglass which improves the shortcomings mentioned above.

SUMMARY OF THE INVENTION

The present invention relates to a pair of frameless eyeglasses and comprises a lens having two holes defined therethrough and two temples each have a connection unit located at the front end thereof. The connection unit has a slot at the front end thereof. Two sides of the lens are engaged with the two respective slots. A resilient member has the first end thereof connected to the connection unit and the second end of the resilient member separates from the connection unit and extends toward the slot. A block is formed on the second end of each of the resilient member and engaged with the hole of the lens corresponding thereto.

Preferably, each of the connection units has a notch which is located at the other side of the slot. The notch is located corresponding to the block of the resilient member.

The present invention provides the lens having two holes defined therethrough and each connection unit has a resilient member which has a block so as to be engaged with the hole of the lens corresponding thereto. The assembling steps are easy and convenient. When removing the temples, the block is simply pushed out from the hole of the lens. Therefore, the users can easily change different styles of the temples as needed.

The present invention provides the lens having two holes defined therethrough and each connection unit has a resilient member which has a block so as to be engaged with the hole of the lens corresponding thereto. Therefore, no screws or rivets are needed and the shortcomings such as the threads broken, the temples loosened, easily lost of the screw and the special tool needed can be avoided.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
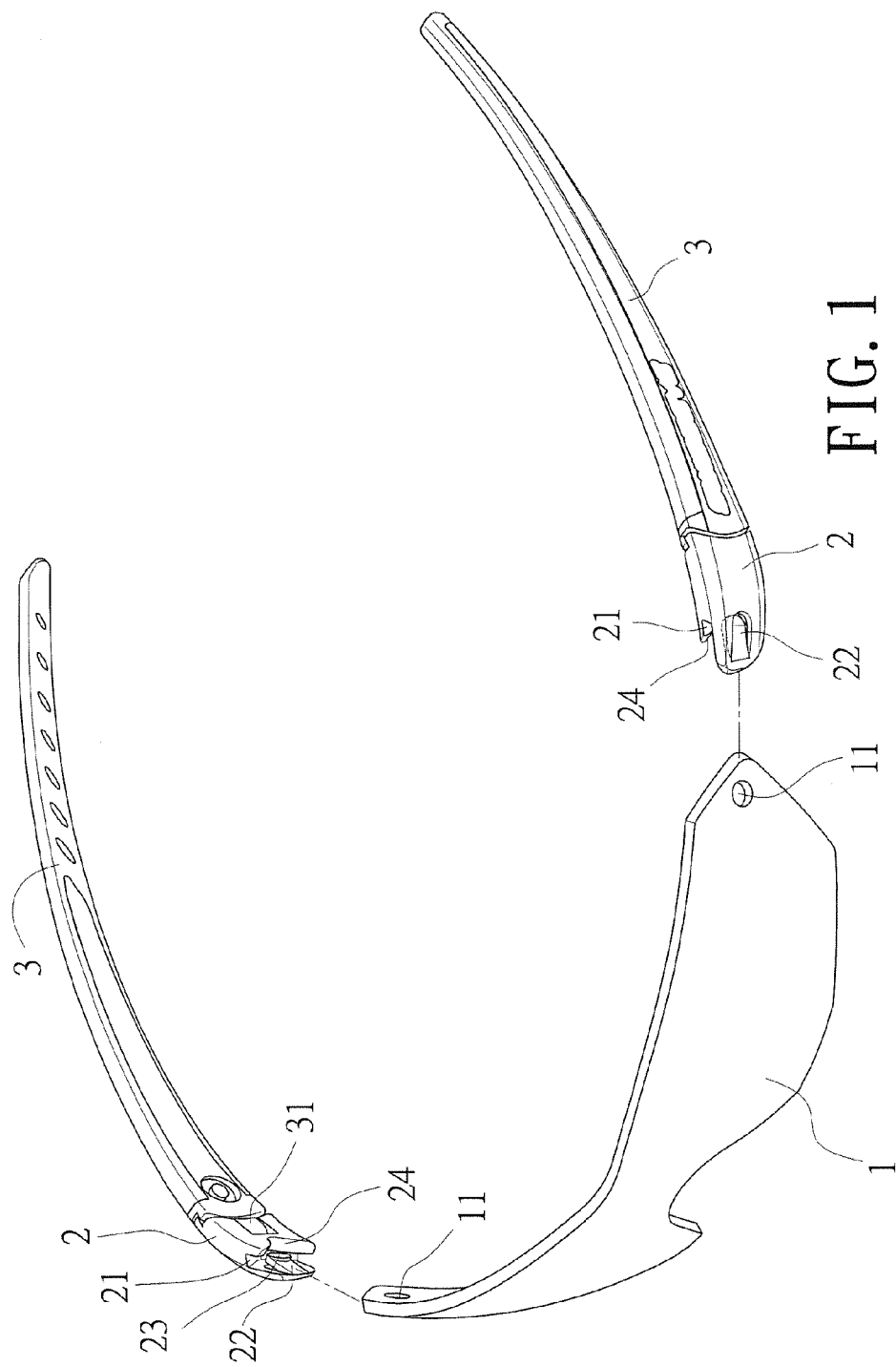
FIG. 1 is an exploded view to show the frameless eyeglasses of the present invention.
Figure 2:
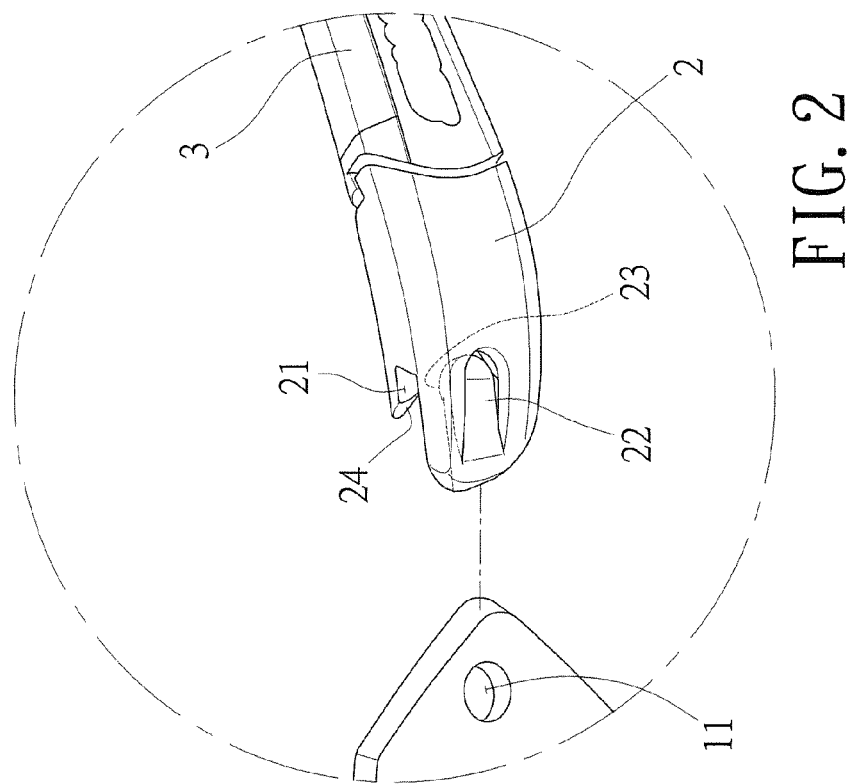
FIG. 2 is an enlarged view to show the connection unit and the lens.
Figure 3:
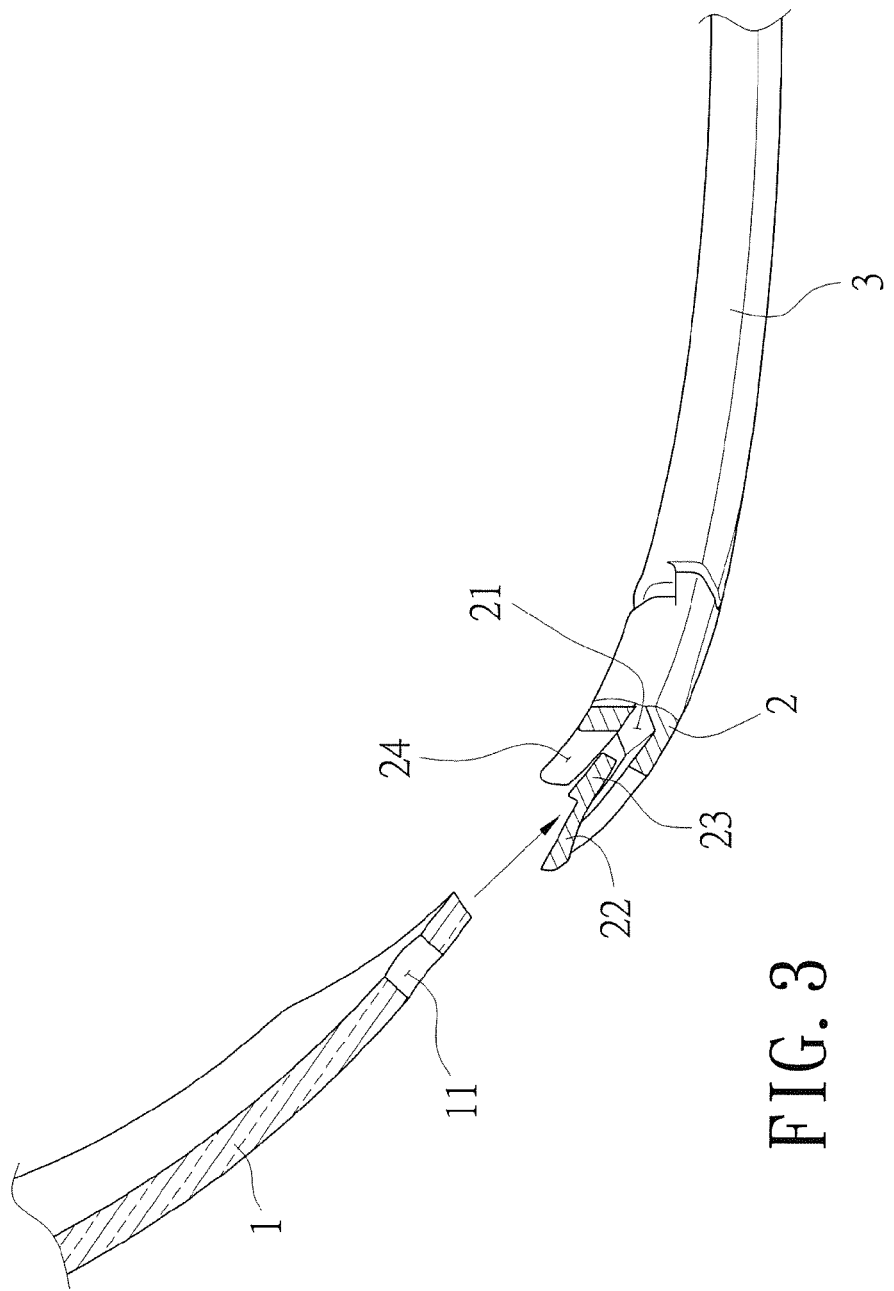
FIG. 3 shows that the temple is to be connected to the lens.

Referring to FIGS. 1 to 3, the frameless eyeglasses of the present invention comprises a lens 1, two connection units 2 and two temples 3.

The lens 1 has two holes 11 defined through two sides thereof.

The two temples 3 each have the connection unit 2 located at the front end thereof and each of the connection units 2 has a slot 21 defined in the front end thereof. Two sides of the lens 1 are engaged with the two respective slots 21. A resilient member 22 has a first end connected to the connection unit 2 and a second end of the resilient member 22 separates from the connection unit and extends toward the slot 21. A block 23 is formed on the second end of each of the resilient member 22 and engaged with the hole 11 of the lens 1 corresponding thereto. Each of the connection units 2 has a notch 24 which is located at the other side of the slot 21. The notch 24 is located corresponding to the block 23 of the resilient member 22. The temples 3 are connected to the rear ends of the two connection units 2.

Figure 4:
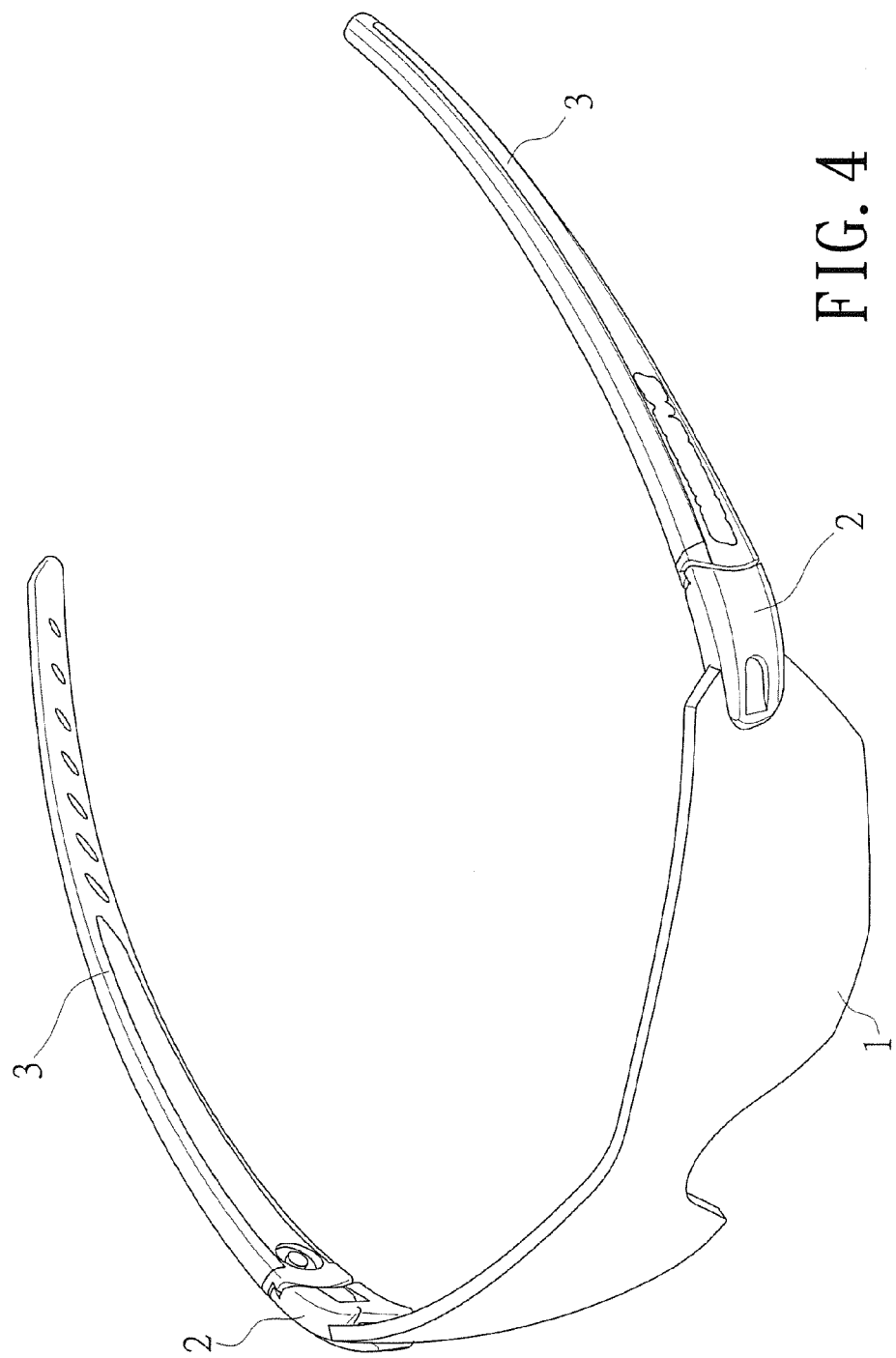
FIG. 4 is a perspective view to show the frameless eyeglasses of the present invention.

When assembling, the temples 3 are connected to the rear ends of the two connection units 2, and the two sides of the lens 1 are engaged with the slots 21 of the two connection units 2 of the temples 3. When inserting the lens 1 into the slots 21, the blocks 23 on the resilient members 22 are engaged with the holes 11 of the lens 1 so as to complete the assembling steps of the lens 1, the two connection units 2 and the two temples 3 as shown in FIG. 4.

Figure 5:
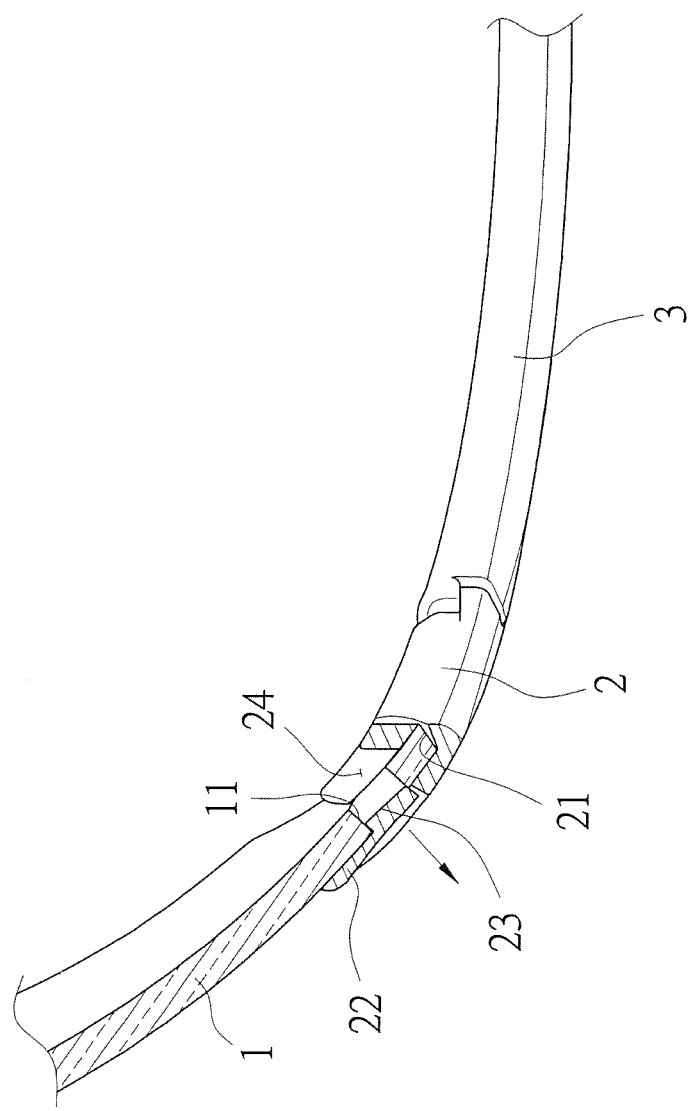
FIG. 5 shows that the temple is to be removed from the lens.

As shown in FIG. 5, when replacing the temples 3, the users push the blocks 23 of the resilient members 22 out from the holes 11 of the lens 1 via the notches 24. The lens 1 and the connection units 2 are separated from each other.

The connection of the lens 1 and the temples 3 are made by engaging the blocks 23 of the resilient members 22 with the holes 11 of the lens 1. When replacing the temples 3, the users simply push the blocks 23 of the resilient members 22 out from the holes 11 of the lens 1 via the notches 24 to separate the lens 1 from the connection units 2. Different colors and styles of the temples 3 can be easily replaced according the practical needs to match the clothes or decoration. No screws or rivets are needed and the shortcomings such as the threads broken, the temples loosened, easily lost of the screw and the special tool needed can be avoided.

There are advantages of the present invention such as the lens has two holes defined therethrough and each connection unit has a resilient member which has a block so as to be engaged with the hole of the lens corresponding thereto. The assembling steps are easy and convenient. When removing the temples, the block is simply pushed out from the hole of the lens. The users can easily change different styles of the temples as needed.

The present invention provides the lens having two holes defined therethrough and each connection unit has a resilient member which has a block so as to be engaged with the hole of the lens corresponding thereto. Therefore, no screws or rivets are needed and the shortcomings such as the threads broken, the temples loosened, easily lost of the screw and the special tool needed can be avoided.

While we have shown and described the embodiment in accordance with the present invention, it should be clear to those skilled in the art that further embodiments may be made without departing from the scope of the present invention.

What is claimed is:

1. A pair of frameless eyeglasses comprising:
   a lens unit having two laterally opposed side portions having respective holes defined therethrough;
   two temples each having a connection unit located at a front end thereof, the connection unit having a slot formed at a front end thereof to receive one side portion of the lens unit for engagement therewith, a resilient member having a first end connected to the connection unit and an intermediate portion extending deflectively therefrom to terminate at a free second end, the second end of the resilient member extending toward the slot when the intermediate portion is disposed in an undeflected position and drawn away from the slot when the intermediate portion is disposed in a deflected position, a block formed on the second end of each resilient member to engage a corresponding hole of the lens unit when assembled therewith;
   wherein the intermediate portion of the resilient member on each connection unit is disposed substantially at the undeflected position when assembled with the lens unit.

2. The frameless eyeglasses as claimed in claim 1, wherein each of the connection units includes a wall partially bounding the slot, the wall having a notch formed therein to oppose the block of the resilient member across the slot.

* * * * *